Figure 1:
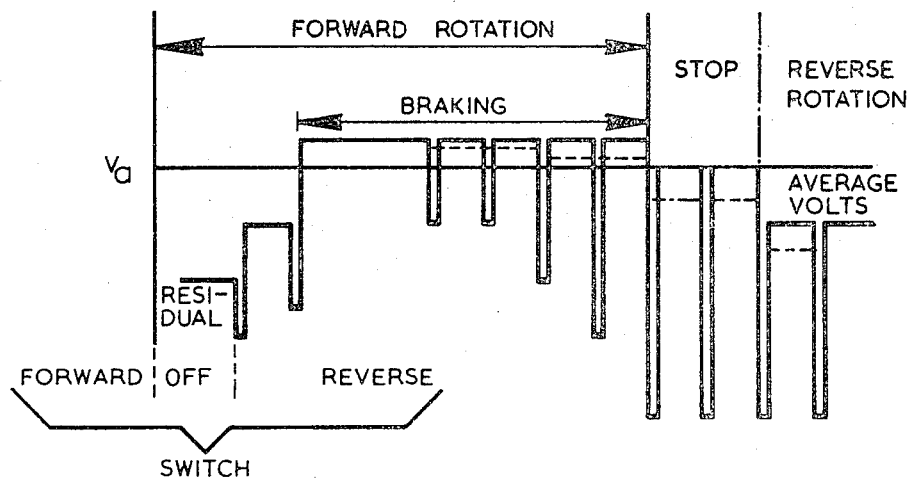

United States Patent [19]
Morton et al.

[11] 3,819,997
[45] June 25, 1974

[54] CONTROL CIRCUITS FOR D.C. ELECTRIC MOTORS

[75] Inventors: John Morton, Hazel Grove; Keith Drummond Stevens, Marple; Graham Spencer Thexton, Marple, all of England

[73] Assignee: Cableform Limited, Stockport, England

[22] Filed: July 10, 1972

[21] Appl. No.: 270,055

Related U.S. Application Data

[63] Continuation of Ser. No. 84,641, Oct. 28, 1970, abandoned.

[52] U.S. Cl. ................................. 318/258, 318/373
[51] Int. Cl. ............................................. H02p 3/08
[58] Field of Search ......................... 318/256–258, 318/261, 284, 285, 373, 599

[56] References Cited
UNITED STATES PATENTS
3,188,545   6/1965   Sheheen ........................ 318/258 X
3,641,411   2/1972   Nemiroff ........................... 318/373

Primary Examiner—Bernard A. Gilheany
Assistant Examiner—W. E. Duncanson, Jr.
Attorney, Agent, or Firm—Holman & Stern

[57] ABSTRACT

In the control of a reversible D.C. electric motor, such as is used in a battery operated vehicle, it is necessary that the applied current should be restricted, while the motor is running-on in a direction opposite to that newly selected i.e., during braking. The invention provides means for reliably determining when the motor has come to or passes through rest so that thereafter a full range of control current can be applied.

5 Claims, 2 Drawing Figures

CONTROL CIRCUITS FOR D.C. ELECTRIC MOTORS

This is a Continuation of application Ser. No. 84,641, filed Oct. 28, 1970 now abandoned.

This invention relates to control circuits for controlling D.C. electric motors, for example, a battery operated motor as is used in battery operated vehicles.

In such control circuits current from the D.C. source, e.g. battery, to the motor is supplied in pulses controlled by a thyristor arrangement, the conduction of which is controlled by a pulse generator so that the mean power supplied to the motor is varied by varying the frequency and/or mark-space ratio of the generator pulses.

In such arrangements electrical braking is obtained by throwing a reversing switch which reverses the field winding connections. However, due to the high e.m.f. generated and the consequential currents, the field current has to be kept relatively low even for heavy braking.

An object of the present invention is to provide a control circuit which inhibits the application of high field currents to the motor after the reversing switch has been thrown and before the motor has substantially come to rest.

According to the invention there is provided a control circuit for controlling a D.C. switch which provides pulses of current from a D.C. source to the motor, which pulses vary in frequency and/or mark-space ratio in accordance with a control signal, a forward/reverse switch which has an intermediate "off" condition, a pulse counter which is connected to the motor circuit to count pulses of voltage across the armature of the motor and which commences counting from zero each time the forward/reverse switch is moved into or through the "off" condition, and change-over means which, when the counter is in the operation of counting between zero and a predetermined count, restricts the range of current which may be applied to the motor but enables a full range of current to be applied to the motor at other times.

Figure 2:
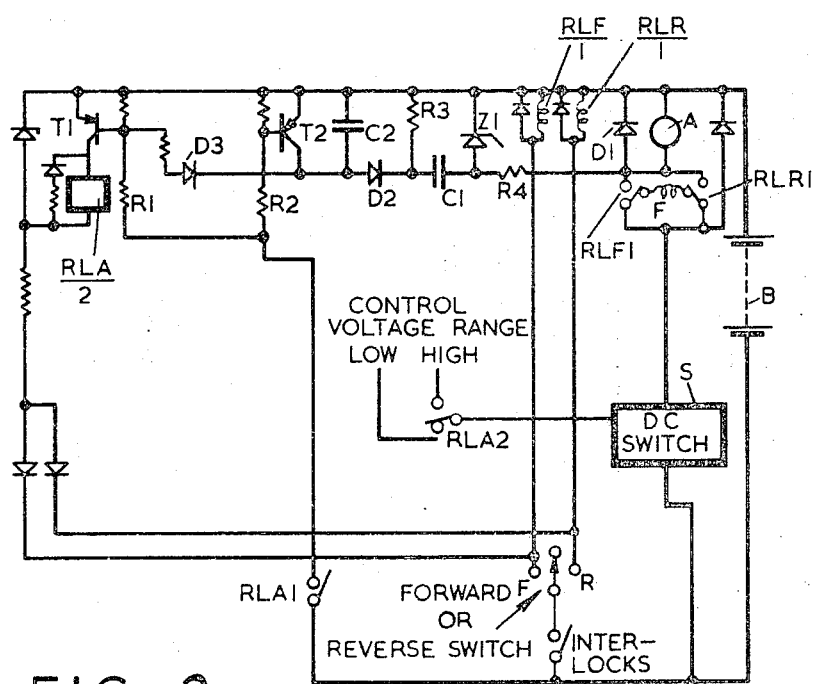

An embodiment of the invention will now be described, by way of example, with reference to the accompanying drawings, in which:

FIG. 1 is a graph showing the voltage across the armature of motor at reversing, and FIG. 2 is a schematic circuit diagram of a control circuit in accordance with the invention.

Referring to FIG. 1, the graph shows the voltage Va that appears across the armature of a motor plotted against time. The first part of the graph marked "residual" depicts the back e.m.f. that is generated by the motor at a time when the forward/reverse switch is switched to "off" and the motor is still rotating. This back e.m.f. is reduced in amplitude from that which would normally exist during normal forward operation of the motor, this back e.m.f. being illustrated as negative with respect to battery positive. The armature has a diode $D_1$ connected across it and since the back e.m.f. is negative with respect to battery positive, the polarity of the residual voltage or back e.m.f. is such as to reverse bias this diode. The forward/reversing switch then is passed to reverse which serves to reverse the connection to the field winding and the d.c. switch then starts to generate reverse field current pulses. The first pulse generated through the field winding may or may not be sufficient to actually reverse the polarity of the field. In this instance, and as illustrated, when the second current pulse has been generated, the polarity of the field is reversed. When the field polarity reverses, the voltage generated by the armature also reverses, and at this point, "braking" of the motor commences as illustrated on the graph. Specifically, the generation of negative field pulses through the field winding by the d.c. switch continues but do not appear across the armature until such time that the motor speed has reduced the armature current to the value of the field current. At this point, the reverse field current pulses do appear across the armature as shown so as to forward bias the diode. The pulses generated by the d.c. switch continue to be produced until the motor comes to rest and then reverses. It is essential that the motor has come substantially to rest before full driving voltage is applied to the motor. The stationary condition of the motor can be detected by observing that the mean armature voltage becomes negative but such D.C. level detection can be confused with the residual voltage, because at low pulse rate the mean voltage is low. In accordance with the invention this difficulty is overcome by a pulse counting circuit.

Referring to FIG. 2, a motor, comprising an armature A and a reversible field F, is supplied with current from a battery B via a D.C. switch S, which comprises a thyristor arrangement providing pulses of current of frequency and duration controlled by a control signal. A forward/reverse switch FR controls contactors RLF and RLR which together have contacts RLF1 and RLR1 for reversing the field F. Across the motor armature there is a diode D1 which acts as already explained. The pulses of voltage across the armature A are taken to a counting circuit via a series resistor R4 and shunt Zener diode Z1 which ensure constant amplitude pulses. The counting circuit comprising small capacitor C1 and large capacitor C2, diode D2 and resistor R3 so that the charge on capacitor C2 increases with each pulse until the switching voltage of a transistor T1 is reached.

When the interlock is closed and the switch FR is set to forward or reverse transistor T1 is primed. Pulses appear across the armature A and the counting circuit commences counting. After a predetermined count the voltage on capacitor C2 overcomes the reverse bias on a diode D3 and transistor T1 becomes conductive energising relay RLA. Contacts RLA1 apply, via resistor R2, a supply voltage to a transistor T2 which becomes conductive and discharges, and holds discharged, capacitor C2. Also transistor T1 is held conductive via resistor R1. Contacts RLA2 change over the control voltage from a low range to a high range. Thus the high range of control voltage cannot be applied to the D.C. switch until a predetermined number of pulses have been counted thus ensuring that the motor has become, or is, stationary before the high range of motor current can be applied.

When the switch FR is moved from forward to reverse or vice versa it passes through an 'off' position which removes the enabling voltage from transistor T1 and relay RLA drops out, changing the control range from high to low, the low range being appropriate to braking. After the predetermined count relay RLA is again energised allowing the high range of control to be used.

Although the relays are shown as electro-magnetic semi-conductor relays equivalent thereto may be used.

What is claimed is:

1. A control circuit for controlling a D.C. electric motor, said control circuit comprising a D.C. switch means which provides pulses of current from a D.C. source to the motor, which pulses vary in frequency and/or mark-space ratio in accordance with a control signal, a forward/reverse switch means which has an intermediate "off" condition, a pulse counter means which is connected to the motor circuit to count pulses of voltage across the armature of the motor and which commences counting from zero each time the forward/reverse switch means is moved into or through the "off" condition, and change-over means which, when the counter is in the operation of counting between zero and a predetermined count, restricts the range of current which may be applied to the motor but enables a full range of current to be applied to the motor at other times, said change-over means, when enabling the full range of current to be applied to the motor, also causing the counter means to be returned to and held at zero in readiness for a counting operation to be initiated by the forward/reverse switch means being moved into or through the "off" condition, and wherein the pulse counter means comprises a small series capacitor and a large shunt capacitor interconnected by a diode, said large capacitor being shunted by a discharging transistor which is rendered conductive when the change-over means is enabling the full range of current to be applied to the motor.

2. A control circuit as defined in claim 1, wherein the voltage across the large capacitor is applied to relay means controlling said change-over means.

3. A control circuit as defined in claim 2, wherein said relay means includes a transistor, the voltage across said large capacitor being applied to the base of the transistor via a diode, and the predetermined count being determined by when the large capacitor voltage reaches the threshold voltage of the diode and the transistor.

4. A control circuit for controlling a D.C. electric motor, said control circuit comprising a D.C. switch means which provides pulses of current from a D.C. source to the motor, which pulses vary in frequency and/or mark-space ratio in accordance with a control signal, a forward/reverse switch means which has an intermediate "off" condition, a pulse means which is connected to the motor circuit to count pulses of voltage across the armature of the motor and which commences counting from zero each time the forward/reverse switch means is moved into or through the "off" condition, and change-over means which, when the counter is in the operation of counting between zero and a predetermined count, restricts the range of current which may be applied to the motor but enables a full range of current to be applied to the motor at other times, and wherein the pulse counter means is connected to the motor armature circuit by limiting means providing that the pulses passing to the counter are of substantially constant amplitude.

5. A control circuit as defined in claim 4, wherein said limiting means includes a series resistor and a shunt Zener diode.

* * * * *